(12) United States Patent  
Asada et al.

(10) Patent No.: US 7,388,317 B2  
(45) Date of Patent: Jun. 17, 2008

(54) ULTRASONIC TRANSMITTING/RECEIVING DEVICE AND METHOD FOR FABRICATING THE SAME

(75) Inventors: Takaaki Asada, Moriyama (JP); Akiteru Takatsuka, Otsu (JP)

(73) Assignee: Murata Manufacturing Co., Ltd, Kyoto (JP)

( * ) Notice: Subject to any disclaimer, the term of this patent is extended or adjusted under 35 U.S.C. 154(b) by 1056 days.

(21) Appl. No.: 10/788,203

(22) Filed: Feb. 27, 2004

(65) Prior Publication Data

US 2004/0171936 A1 Sep. 2, 2004

(30) Foreign Application Priority Data

Feb. 27, 2003 (JP) ............................ 2003-050697  
Jun. 3, 2003 (JP) ............................ 2003-157942  
Jan. 20, 2004 (JP) ............................ 2004-011624

(51) Int. Cl.  
*H01L 41/08* (2006.01)

(52) U.S. Cl. ...................... 310/322; 310/334

(58) Field of Classification Search ............... 310/322, 310/334  
See application file for complete search history.

(56) References Cited

U.S. PATENT DOCUMENTS 4,031,757 A * 6/1977 Colton ..................... 73/861.23  
5,274,573 A * 12/1993 Buisker et al. ............ 702/103  
5,803,334 A * 9/1998 Patel et al. ................... 226/45  
5,843,877 A * 12/1998 Park et al. .................. 510/220  
6,289,729 B1 * 9/2001 Haque et al. ................ 73/159  
7,075,099 B2 * 7/2006 Buisker et al. ......... 250/559.36

FOREIGN PATENT DOCUMENTS

| JP | 60-190853 A | 9/1985 |
| JP | 3-194462 A | 8/1991 |
| JP | 06-090950 | 4/1994 |
| JP | 06-288990 | 10/1994 |
| JP | 06-288993 | 10/1994 |
| JP | 11-155859 | 6/1999 |
| JP | 2000-014672 | 1/2000 |
| JP | 2001-133319 A | 5/2001 |

OTHER PUBLICATIONS

Official communication issued in the counterpart Japanese Application No. 2004-011624, mailed on Jul. 3, 2007.

* cited by examiner

*Primary Examiner*—Thomas M Dougherty  
(74) *Attorney, Agent, or Firm*—Keating & Bennett, LLP

(57) ABSTRACT

An ultrasonic transmitting/receiving device that effectively suppresses ringing during emission of ultrasonic waves and improves time resolution when measuring a sonic velocity includes a pair of ultrasonic transducers. Each of the ultrasonic transducers has a piezoelectric vibrator including a first electrode and a second electrode that are separated by a piezoelectric body and a backing disposed in contact with the first electrode and composed of the same material as a material of the piezoelectric body. The ultrasonic transducers are connected by a support so as to face each other and have a substantially rectangular U-shape as a whole when viewed from the side.

24 Claims, 8 Drawing Sheets

3a (3b)

4a (4b)

3a (3b)

4a (4b)

ULTRASONIC TRANSMITTING/RECEIVING DEVICE AND METHOD FOR FABRICATING THE SAME

BACKGROUND OF THE INVENTION

1. Field of the Invention

The present invention relates to an ultrasonic transmitting/receiving device and a method for fabricating the same.

2. Description of the Related Art

A typical known ultrasonic transmitting/receiving device has two ultrasonic transducers that face each other with a predetermined gap therebetween. Each of the ultrasonic transducers includes a piezoelectric vibrator having two electrodes which are separated by a piezoelectric body composed of polarized ceramic material such as lead zirconate titanate (PZT). The surface of one electrode is covered by a backing composed of rubber such as silicone rubber (see Japanese Unexamined Patent Application Publication Nos. 2000-14672, 11-155859, and 6-90950).

In the ultrasonic transducer, application of an electrical signal between the two electrodes excites the piezoelectric vibrator, which then emits ultrasonic waves, whereas reception of ultrasonic waves between the two electrodes vibrates the piezoelectric vibrator, which then converts the vibration into an electrical signal and outputs the signal. The backing absorbs and attenuates the ultrasonic waves emitted through the back surface of the piezoelectric vibrator during vibration.

In measuring the sonic velocity in a liquid medium using the ultrasonic transmitting/receiving device having a pair of ultrasonic transducers, ultrasonic waves are transmitted from one ultrasonic transducer through the liquid medium to the other ultrasonic transducer and the gap transit time, i.e., the time required for the ultrasonic waves to travel from one ultrasonic transducer to the other ultrasonic transducer is measured. The sonic velocity is calculated based on the gap transit time and the distance between the two ultrasonic transducers (see Japanese Unexamined Patent Application Publication Nos. 6-288993 and 6-288990).

When the sonic velocity of a small amount of liquid medium is measured with the ultrasonic transmitting/receiving device having two ultrasonic transducers facing each other, the ultrasonic transducers must be placed at a small distance from each other, resulting in a short gap transit time.

When a backing is provided on the piezoelectric vibrator, the backing attenuates the ultrasonic waves emitted through the back surface of the piezoelectric vibrator. Unfortunately, the acoustic characteristic impedance of the piezoelectric body that defines the piezoelectric vibrator and that of the backing are significantly different. For example, the acoustic characteristic impedance of the piezoelectric body is $30 \times 10^6$ $kg/m^2 \cdot s$, whereas that of the backing is $5-7.5 \times 10^6$ $kg/m^2 \cdot s$. This great difference in the acoustic characteristic impedance causes ringing. Ringing is a phenomenon in which sonic waves are reflected at the interface between the piezoelectric vibrator and the backing during vibration of the piezoelectric vibrator, generating resonance in the piezoelectric body. Due to this resonance, the piezoelectric vibrator does not stop vibrating in a short period of time but continues vibrating.

If ringing occurs in an ultrasonic transmitting/receiving device having ultrasonic transducers disposed with a small gap, vibration attributed to the ringing may be included in the electrical signal outputted from the receiving ultrasonic transducer. This increases measurement error, thereby deteriorating the accuracy of the time resolution. Specifically, when the sonic velocity of a liquid medium is measured by consecutively emitting ultrasonic waves a number of times at certain intervals and calculating the mean of the obtained times, the ringing influences the accuracy of the measurement.

As described above, when the ultrasonic transmitting/receiving device has a pair of ultrasonic transducers, it is difficult to effectively suppress the ringing during emission of ultrasonic waves. Thus, this type of ultrasonic transmitting/receiving device is unable to maximize time resolution in measuring the sonic velocity.

SUMMARY OF THE INVENTION

To solve the aforementioned problems, preferred embodiments of the present invention provide an ultrasonic transmitting/receiving device that can effectively suppress ringing during emission of ultrasonic waves and enhance time resolution in measuring sonic velocity, and also provide a method for fabricating such a novel ultrasonic transmitting/receiving device.

An ultrasonic transmitting/receiving device according to a preferred embodiment of the present invention includes a pair of ultrasonic transducers, each of the ultrasonic transducers having a piezoelectric vibrator including a first electrode and a second electrode that are separated by a piezoelectric body and a backing disposed in contact with the first electrode and composed of the same material as a material composing the piezoelectric body. The ultrasonic transducers are positioned between a support such that the second electrodes are arranged to face each other with a predetermined gap therebetween and the ultrasonic transmitting/receiving device has a substantially rectangular U-shape when viewed from the side.

In the ultrasonic transmitting/receiving device according to a preferred embodiment of the present invention, the piezoelectric vibrator and the backing are preferably unitary.

In the ultrasonic transmitting/receiving device according to a preferred embodiment of the present invention, preferably the first electrode and the second electrode are located inside the piezoelectric body.

In the ultrasonic transmitting/receiving device according to a preferred embodiment of the present invention, preferably an outer surface of the backing has a plurality of projections and depressions, the outer surface being not in contact with the piezoelectric vibrator.

In the ultrasonic transmitting/receiving device according to a preferred embodiment of the present invention, the depths of the depressions are preferably smaller than or equal to about forty percent (40%) of the entire thickness of the ultrasonic transducer.

In the ultrasonic transmitting/receiving device according to a preferred embodiment of the present invention, the pair of ultrasonic transducers is preferably unitary with the support.

According to the method for fabricating the ultrasonic transmitting/receiving device according to a preferred embodiment of the present invention includes a step of preparing a fired ceramic structure having two pairs of the first electrode and the second electrode therein and a step of removing a mid-portion of the fired ceramic structure, the mid-portion being disposed between the two pairs of the first electrode and the second electrode so that the fired ceramic structure has a substantially rectangular U-shape when viewed from the side.

According to the ultrasonic transmitting/receiving device of various preferred embodiments of the present invention, the backings provided on the ultrasonic transducers are preferably composed of the same material as a material composing the piezoelectric body so that the acoustic characteristic impedance of the backings are the same as that of the piezoelectric body. Thus, reflections of ultrasonic waves due to the difference in acoustic characteristic impedance do not occur and thus the piezoelectric vibrators are free from resonance caused by the reflections of ultrasonic waves, thereby effectively suppressing ringing during emission of ultrasonic waves. Hence, time resolution is improved when measuring the sonic velocity of a liquid medium by transmitting and receiving ultrasonic waves between the ultrasonic transducers and thus the ultrasonic transmitting/receiving device can provide accurate measurement of sonic velocity. In addition, the ultrasonic transducers are arranged to face each other and have a substantially rectangular U-shape as a whole when viewed from the side. Thus, even though the ultrasonic transducers are disposed with a small gap therebetween, loss of ultrasonic waves is quite small in practice. Since the loss of ultrasonic waves is small, this compensates for the low vibration efficiency. Thus, the sonic velocity of a small amount of liquid medium can be accurately measured.

In the ultrasonic transmitting/receiving device of various preferred embodiments of the present invention, since the piezoelectric vibrator and the backing are unitary, it is unnecessary to attach the backing to the piezoelectric vibrator with, for example, glue. Accordingly, the ultrasonic transmitting/receiving device can be fabricated with less time and a reduced number of steps and the product yield is improved.

In the ultrasonic transmitting/receiving device of preferred embodiments of the present invention, the first and second electrodes are buried in the piezoelectric body. So even when the ultrasonic transmitting/receiving device is used in a corrosive liquid, the electrodes are free from corrosion. Thus, the ultrasonic transmitting/receiving device can provide long term reliability.

In the ultrasonic transmitting/receiving device of various preferred embodiments of the present invention, the outer surface of the backing, which is not in contact with the vibrator, has a plurality of projections and depressions so that the received waves reaching the backing through the vibrator are scattered, thereby greatly reducing the amplitude of ultrasonic waves caused by reverberation.

In the ultrasonic transmitting/receiving device of various preferred embodiments of the present invention, since the depths of the depressions are smaller than or equal to about forty percent (40%) of the entire thickness of the ultrasonic transducer, in addition to the effects described in the preceding paragraph, the ultrasonic transmitting/receiving device can minimize the amplitude of the received waves caused by reverberation while providing sufficient mechanical strength of the ultrasonic transmitting/receiving device.

In the ultrasonic transmitting/receiving device of various preferred embodiments of the present invention, since the pair of ultrasonic transducers is unitary with the support, it is quite easy to handle the ultrasonic transmitting/receiving device. Furthermore, when the ultrasonic transducer and the support are composed of ceramic having a small linear expansion coefficient, the gap between the ultrasonic transducers hardly varies in accordance with the change in ambient temperature so that the ultrasonic transmitting/receiving device can accurately and reliably measure the sonic velocity with little error.

In the method for fabricating the ultrasonic transmitting/receiving device of another preferred embodiment of the present invention, the ultrasonic transmitting/receiving device is formed by removing the mid-portion of the fired ceramic structure so that a step of assembling two separately formed ultrasonic transducers is unnecessary. Thus, less time and a reduced number of steps are required and the product yield is improved. Furthermore, the ultrasonic transmitting/receiving device can be miniaturized and alignment of the beam axis between the ultrasonic transducers is unnecessary, allowing the quality of the ultrasonic transmitting/receiving device to be stabilized.

Thus the ultrasonic transmitting/receiving device according to various preferred embodiments of the present invention can effectively suppress ringing during emission of ultrasonic waves and enhance time resolution when measuring a sonic velocity. Furthermore, with the method for fabricating the ultrasonic transmitting/receiving device of preferred embodiments of the present invention, the ultrasonic transmitting/receiving device is readily produced.

Other features, elements, steps, characteristics and advantages of the present invention will become more apparent from the following detailed description of preferred embodiments with reference to the attached drawings.

DETAILED DESCRIPTION OF PREFERRED EMBODIMENTS

Figure 1A:
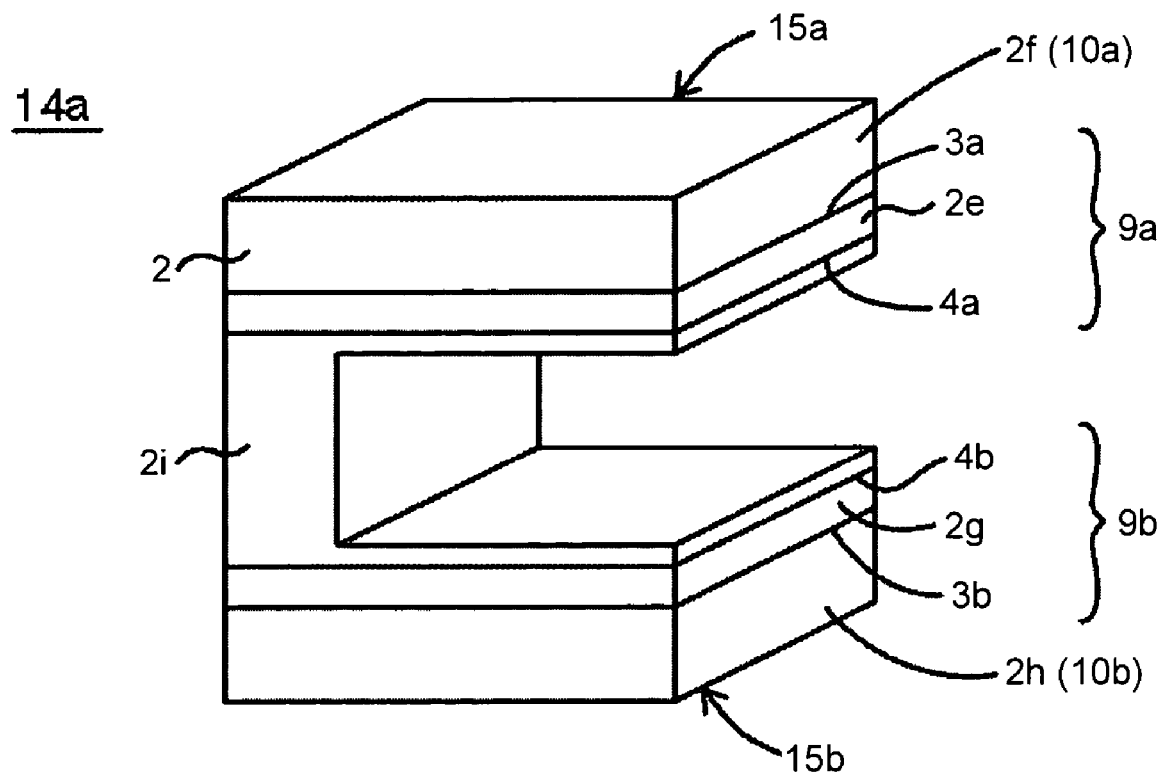
FIG. 1A is a perspective view of an ultrasonic transmitting/receiving device according to a first preferred embodiment of the present invention.
Figure 1B:
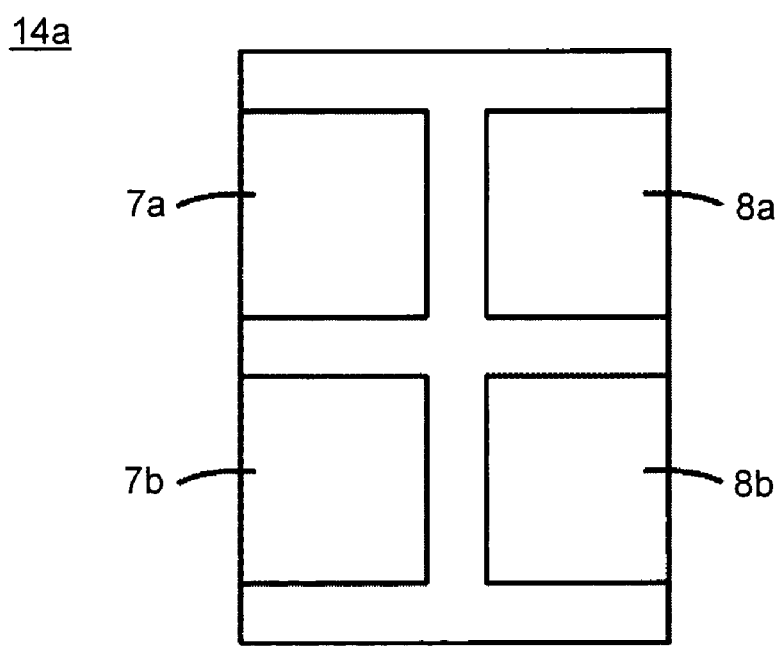
FIG. 1B is a side view of the ultrasonic transmitting/receiving device according to the first preferred embodiment of the present invention.
Figure 2A:
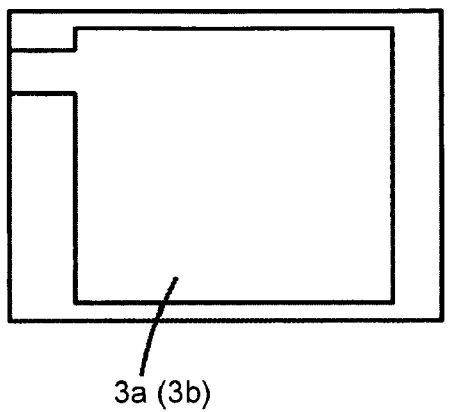
FIGS. 2A and 2B are plan views showing electrode patterns formed inside a piezoelectric body.
Figure 2A:
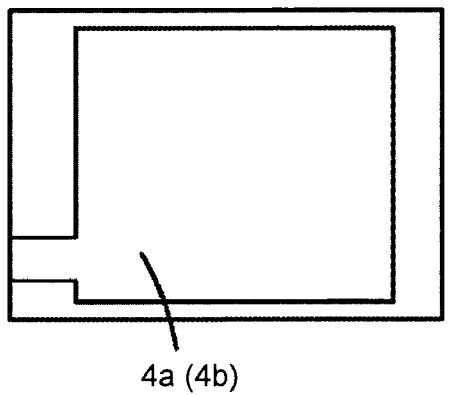
Figure 2B:
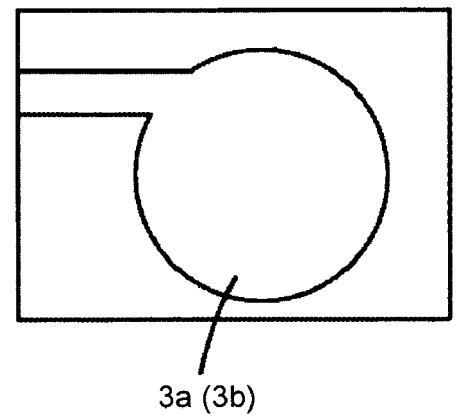
Figure 2B:
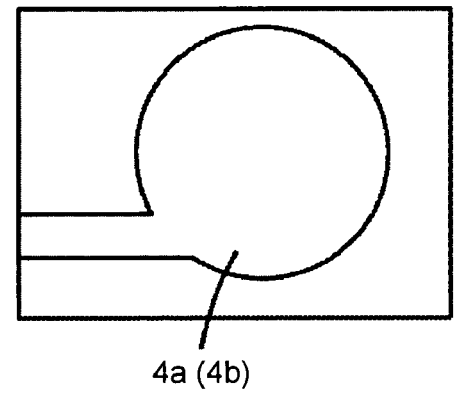

FIG. 1A is a perspective view of an ultrasonic transmitting/receiving device according to a first preferred embodiment of the present invention and FIG. 1B is a side view of a support of the ultrasonic transmitting/receiving device. FIGS. 2A and 2B are plan views of electrode patterns disposed inside a piezoelectric body.

An ultrasonic transmitting/receiving device 14a according to the first preferred embodiment includes a piezoelectric body 2 having a substantially rectangular U-shape when viewed from the side. A pair of a top internal electrode (first electrode) 3a and a top internal electrode (second electrode) 4a and a pair of a bottom internal electrode (first electrode) 3b and a bottom internal electrode (second electrode) 4b are respectively located in the top and bottom longitudinally extended portions of the piezoelectric body 2. These two pairs of electrodes are substantially parallel to each other. The top internal electrodes 3a and 4a and the bottom internal electrodes 3b and 4b may have substantially square planar shapes, as shown in FIG. 2A, or substantially circular planar shapes, as shown in FIG. 2B. The shapes of the top internal electrodes 3a and 4a and the bottom internal electrodes 3b and 4b are not limited to the shapes shown in FIGS. 2A and 2B and other shapes may arbitrarily be applied depending on the sound pressure or the waveform of the sound pressure.

The ultrasonic transmitting/receiving device 14a includes an ultrasonic transducer 15a and an ultrasonic transducer 15b. The ultrasonic transducer 15a is disposed in the top longitudinally extended portion of the piezoelectric body 2 and has a piezoelectric vibrator 9a including the top internal electrodes 3a and 4a and an activated portion 2e disposed between the top internal electrodes 3a and 4a. A portion 2f of the piezoelectric body 2 or backing 10a is in contact with the outer surface of the top internal electrode 3a. The ultrasonic transducer 15a includes the piezoelectric vibrator 9a and the backing 10a, which are integrated.

The ultrasonic transducer 15b is provided in the bottom longitudinally extended portion of the piezoelectric body 2 and has a piezoelectric vibrator 9b including the bottom internal electrodes 3b and 4b and an activated portion 2g disposed between the bottom internal electrodes 3b and 4b. A portion 2h of the piezoelectric body 2 or backing 10b is in contact with the outer surface of the bottom internal electrode 3b. The ultrasonic transducer 15b includes the piezoelectric vibrator 9b and the backing 10b, which are integrated.

In the ultrasonic transmitting/receiving device 14a, the ultrasonic transducer 15a and the ultrasonic transducer 15b are disposed substantially parallel to each other and connected by a support 2i which is interposed between the ultrasonic transducer 15a and the ultrasonic transducer 15b in the piezoelectric body 2. Lead electrodes 7a, 8a, 7b, and 8b are disposed on the outer surface of the support 2i as shown in FIG. 1B. The lead electrode 7a is connected to the top internal electrode 3a, the lead electrode 8a is connected to the top internal electrode 4a, the lead electrode 7b is connected the bottom internal electrode 3b, and the lead electrode 8b is connected to the bottom internal electrode 4b.

In this preferred embodiment, the activated portion 2e and the activated portion 2g are activated through a polarizing process and the portion 2f (backing 10a), the portion 2h (backing 10b), and the support 2i are unpolarized and thus not activated. In preferred embodiments of the present invention, the portions 2f and 2h and the support 2i may also be polarized.

In the ultrasonic transmitting/receiving device 14a according to the first preferred embodiment, the backing 10a (portion 2f) and the backing 10b (portion 2h) are composed of the same material as the activated portion 2e and the activated portion 2g and thus have the same acoustic characteristic impedance as the activated portions 2e and 2g.

When the ultrasonic transducer 15a transmits ultrasonic waves to the ultrasonic transducer 15b, for example, hardly any resonance occurs in the ultrasonic transducers 15a and 15b, thereby effectively suppressing ringing. This is because the ultrasonic transducers 15a and 15b are respectively equipped with the backings 10a and 10b having the same acoustic characteristic impedance as the piezoelectric body 2 included in the piezoelectric vibrators 9a and 9b.

That is, in the ultrasonic transducer 15a, the acoustic characteristic impedance of the backing 10a is preferably the same as that of the activated portion 2e in the piezoelectric vibrator 9a. Thus, reflections of ultrasonic waves due to the difference in acoustic characteristic impedance do not occur at the interface between the piezoelectric vibrator 9a and the backing 10a. The ultrasonic waves passing through the backing 10a are reflected at the interface to the outside air due to the difference in acoustic characteristic impedance. However, by selecting an appropriate thickness for the backing 10a, emission of ultrasonic waves does not coincide with the arrival of the reflected ultrasonic waves. Thus, hardly any resonance occurs in the piezoelectric vibrator 9a, and ringing can be effectively suppressed during emission of ultrasonic waves. The ultrasonic transducer 15b operates in the same manner as the ultrasonic transducer 15a and thus exhibits the same effects as the ultrasonic transducer 15a.

Accordingly, the ultrasonic transmitting/receiving device 14a according to the first preferred embodiment improves time resolution in measuring the sonic velocity in a liquid medium by transmitting and receiving ultrasonic waves between the ultrasonic transducers 15a and 15b, resulting in accurate measurement of the sonic velocity.

In this case, although resonance does not occur in the ultrasonic transducer 15a and the ultrasonic transducer 15b, vibration efficiency (efficiency of wave transmittance) decreases. Therefore, the ultrasonic transmitting/receiving device 14a of preferred embodiments of the present invention cannot provide higher sound pressure as compared to known ultrasonic transmitting/receiving devices. A small distance between the ultrasonic transducer 15a and the ultrasonic transducer 15b according to preferred embodiments of the present invention allows the loss of ultrasonic waves to be minimized in the ultrasonic transmitting/receiving device 14a in practice. This minimized loss of ultrasonic waves compensates for the low vibration efficiency. Thus, low vibration efficiency does not affect the transmittance and reception of the ultrasonic waves.

Figure 3:
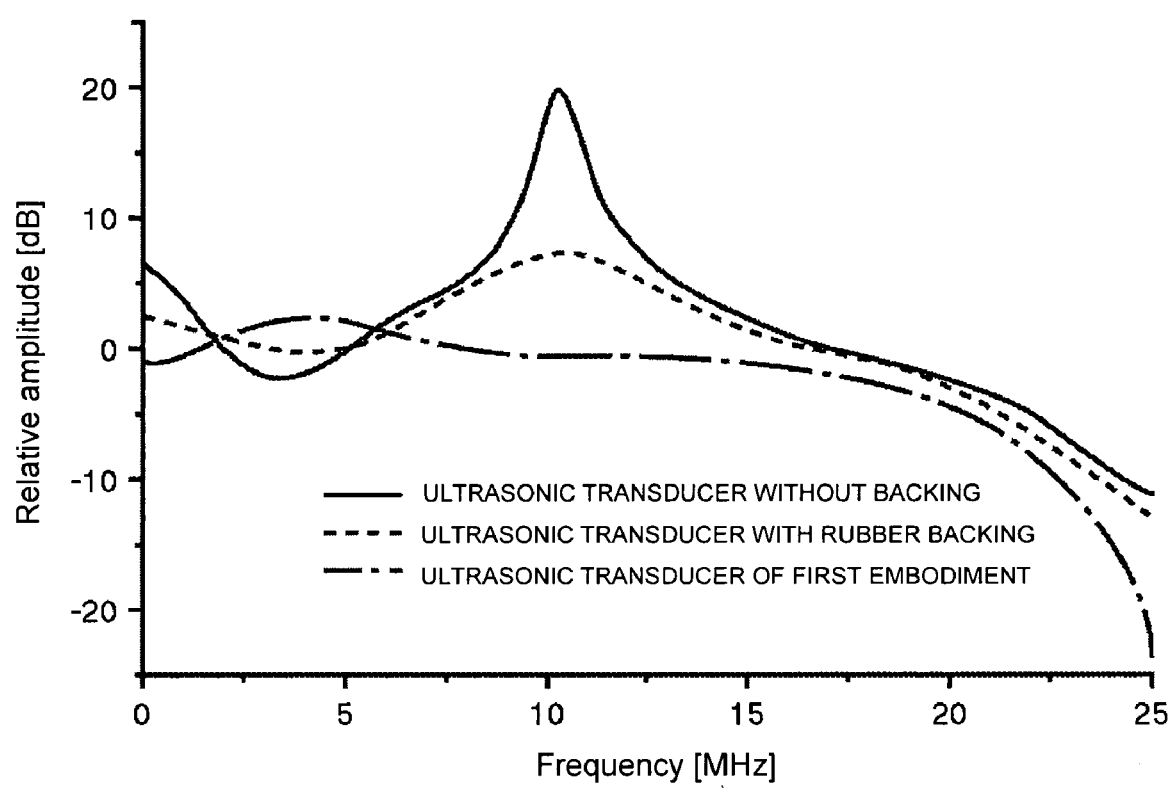
FIG. 3 is a graph showing a relationship between the sound pressure level and the frequency with an ultrasonic transducer in the ultrasonic transmitting/receiving device of the first preferred embodiment and comparative ultrasonic transducers.

FIG. 3 shows the relationship between the sound pressure level and the frequency when the ultrasonic transducer 15a transmits ultrasonic waves underwater, for example. In FIG. 3, the dot-dashed line represents the ultrasonic transducer 15a of the first preferred embodiment, the solid line represents an ultrasonic transducer without backing, and the dotted line represents an ultrasonic transducer with a known rubber backing. With these ultrasonic transducers, the thickness of the activated portion 2e is about 0.16 mm and the thicknesses of the backing 10a and the backing 10b are both about 1.7 mm.

FIG. 3 shows that the ultrasonic transducer 15a of the first preferred embodiment exhibits a wide frequency band and thus improves time resolution, thereby providing accurate measurement.

Figure 4A:
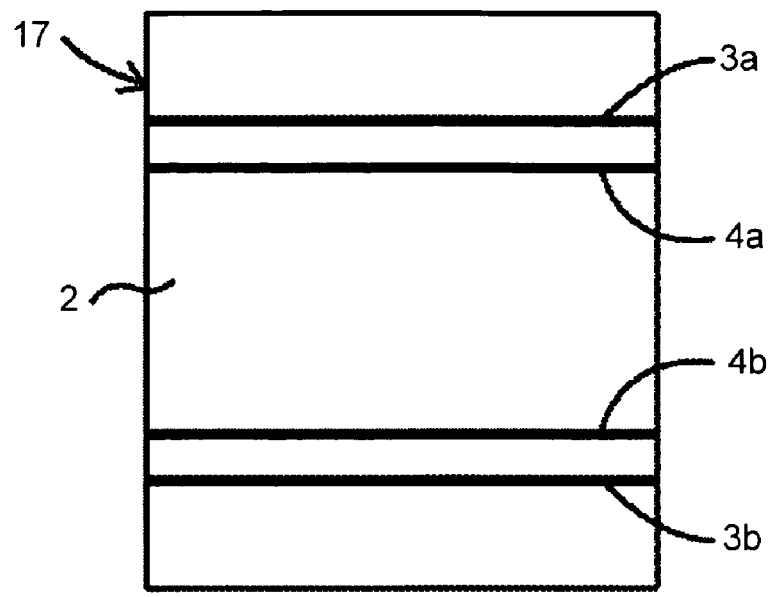
FIGS. 4A and 4B are schematic diagrams for describing a method for fabricating the ultrasonic transmitting/receiving device according to the first preferred embodiment of the present invention.
Figure 4B:
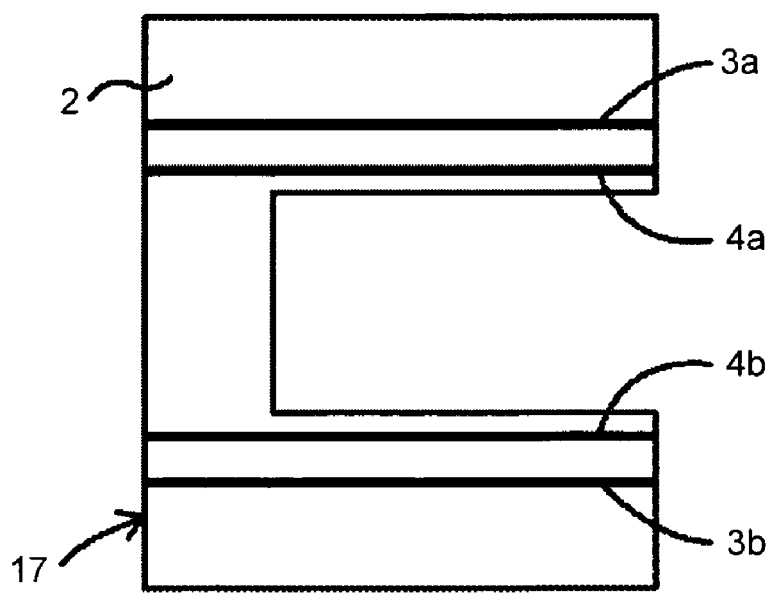

With reference to FIGS. 4A and 4B, steps to fabricate the ultrasonic transmitting/receiving device 14a shown in FIGS. 1A, 1B, 2A, and 2B will now be described.

Referring to FIG. 4A, a plurality of green ceramic sheets is prepared. The green ceramic sheets are coated with conductive paste and laminated. The laminate is fired to form a fired ceramic structure 17. The fired ceramic structure 17 includes the piezoelectric body 2 having the top internal electrodes 3a and 4a and the bottom internal electrodes 3b and 4b.

Turning now to FIG. 4B, the mid-portion of the fired ceramic structure 17 that is disposed between the top internal electrodes 3a and 4a and the bottom internal electrodes 3b and 4b is removed through, for example, a cutting process so that the fired ceramic structure 17 has a substantially rectangular U-shape. The lead electrodes 7a, 8a, 7b, and 8b are formed through a thick-film silver electrode process, vapor deposition, or plating. The activated portion 2e disposed between the top internal electrodes 3a and 4a and the activated portion 2g disposed between the bottom internal electrodes 3b and 4b are activated through a polarizing process, thereby completing the ultrasonic transmitting/receiving device 14a.

As described above, the method for fabricating the ultrasonic transmitting/receiving device of preferred embodiments of the present invention does not require a step of assembling two separately formed ultrasonic transducers. By merely removing the mid-portion of the fired ceramic structure 17, the resulting ultrasonic transmitting/receiving device 14a has a desired structure and shape. Accordingly, the ultrasonic transmitting/receiving device 14a can be fabricated with less time and a reduced number of steps and the product yield is improved. Furthermore, since the ultrasonic transducer 15a and the ultrasonic transducer 15b are integrally formed, the ultrasonic transmitting/receiving device 14a can be miniaturized. Furthermore, it is not necessary to align the beam axis between the ultrasonic transducer 15a and the ultrasonic transducer 15b, allowing the quality of the ultrasonic transmitting/receiving device 14a to be stabilized. If the ultrasonic transmitting/receiving device 14a is used in a corrosive liquid, it is desirable not to expose the top internal electrode 4a and the bottom internal electrode 4b to the corrosive liquid in order to enhance reliability. In addition, even though the electrodes are not exposed, at least components of the ultrasonic transmitting/receiving device 14a that are in contact with the corrosive liquid are preferably covered with resin or glass in order to enhance reliability.

Although in the ultrasonic transmitting/receiving device 14a of the first preferred embodiment, the top internal electrodes 3a and 4a and the bottom internal electrodes 3b and 4b are buried in the piezoelectric body 2, the top internal electrode 4a and the bottom internal electrode 4b may be exposed at the inner surfaces of the top and bottom longitudinally extended portions of the piezoelectric body 2.

Although in this preferred embodiment, the mid-portion of the fired ceramic structure 17 is removed to produce the ultrasonic transmitting/receiving device 14a with a substantially rectangular U-shape, two separate ultrasonic transducers may be connected to each other by a predetermined support with, for example, glue to obtain the substantially rectangular U-shape. Furthermore, the ultrasonic transmitting/receiving device 14a may be produced by forming the piezoelectric body 2 to have a substantially rectangular U-shape including the top internal electrodes 3a and 4a and the bottom internal electrodes 3b and 4b therein and then firing the piezoelectric body 2. In this way, the step of removing the mid-portion of the fired ceramic structure 17 is rendered unnecessary.

Figure 5:
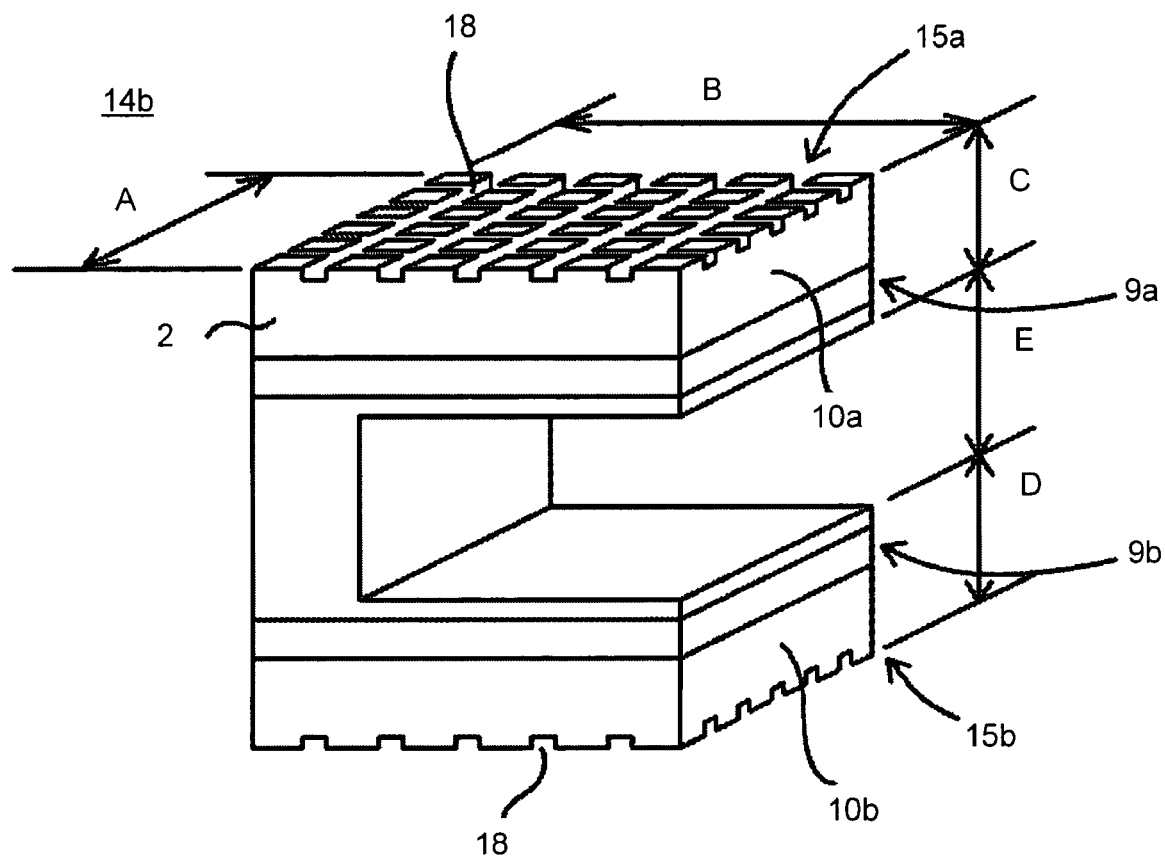
FIG. 5 is a perspective view showing the structure of an ultrasonic transmitting/receiving device according to a second preferred embodiment of the present invention.

FIG. 5 is a perspective view of the general structure of an ultrasonic transmitting/receiving device according to a second preferred embodiment of the present invention. In the ultrasonic transmitting/receiving device 14a of the first preferred embodiment shown in FIGS. 1A, 1B, 2A, and 2B, the outer surfaces of the backing 10a and the backing 10b, which are not in contact with the piezoelectric vibrator 9a and the piezoelectric vibrator 9b, respectively, are flat.

An ultrasonic transmitting/receiving device 14b according to the second preferred embodiment preferably has the same structure as the ultrasonic transmitting/receiving device 14a of the first preferred embodiment except that the outer surfaces of the backing 10a and the backing 10b, which are not in contact with the piezoelectric vibrator 9a and the piezoelectric vibrator 9b, respectively, have a plurality of projections and depressions. That is, a plurality of grooves 18 is formed by, for example, a dicer (not shown) on the outer surfaces of the backing 10a and the backing 10b. The grooves 18 constitute a lattice when viewed from the top.

When the backing 10a and the backing 10b are provided with the grooves 18 on their outer surfaces, as in the second preferred embodiment, ultrasonic waves reaching the backing 10a and the backing 10b through the piezoelectric vibrator 9a and the piezoelectric vibrator 9b are scattered in the grooves 18 so that the amplitude of the received waves caused by reverberation is greatly reduced. Accordingly, the direct waves can be selectively converted into pulses without difficulty when the sonic velocity is measured.

Figure 6A:
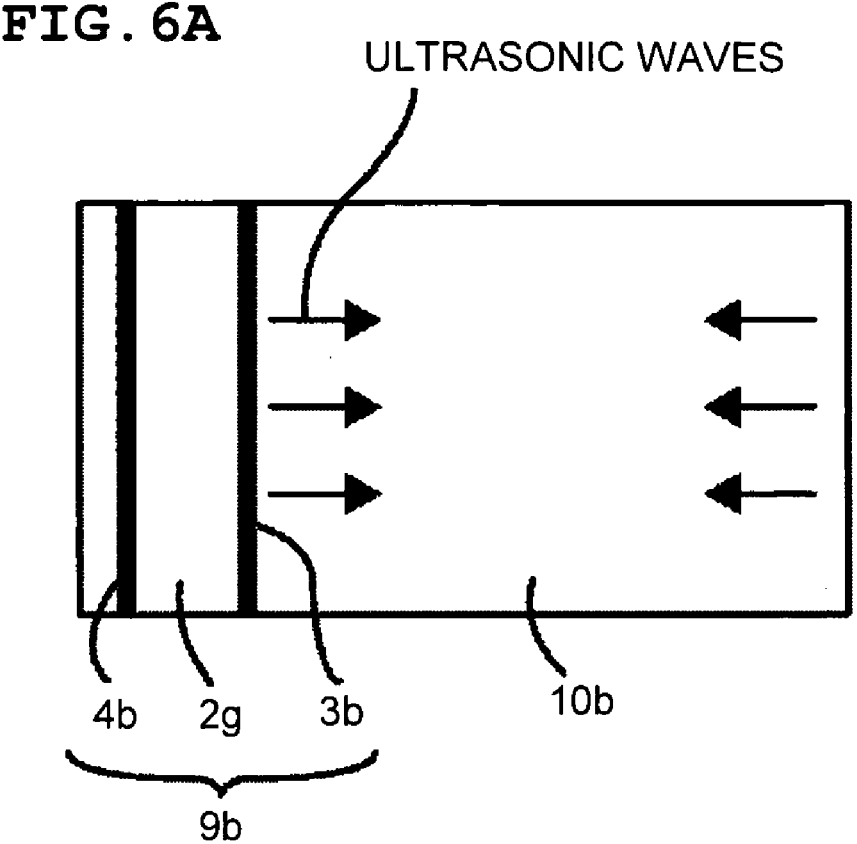
FIG. 6A is a schematic diagram showing reflections of ultrasonic waves in a receiving ultrasonic transducer according to the first preferred embodiment of the present invention.
Figure 6B:
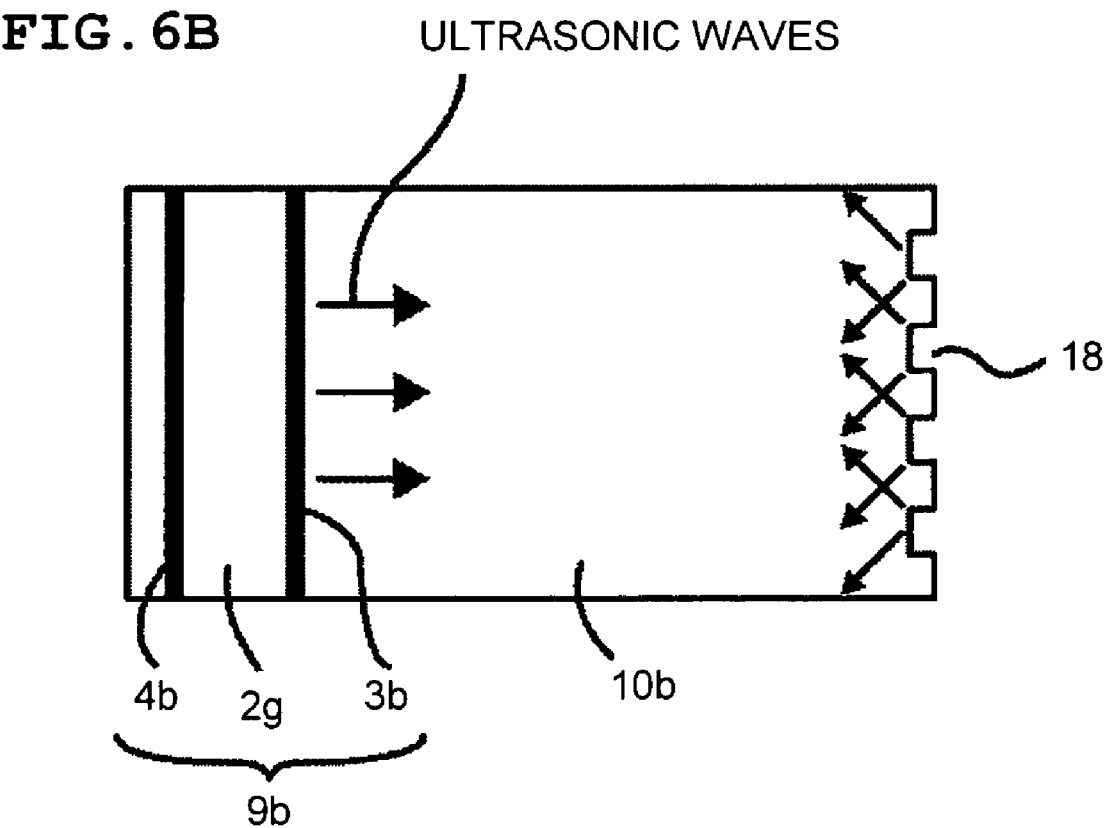
FIG. 6B is a schematic diagram showing reflections of ultrasonic waves in a receiving ultrasonic transducer according to the second preferred embodiment.
Figure 7A:
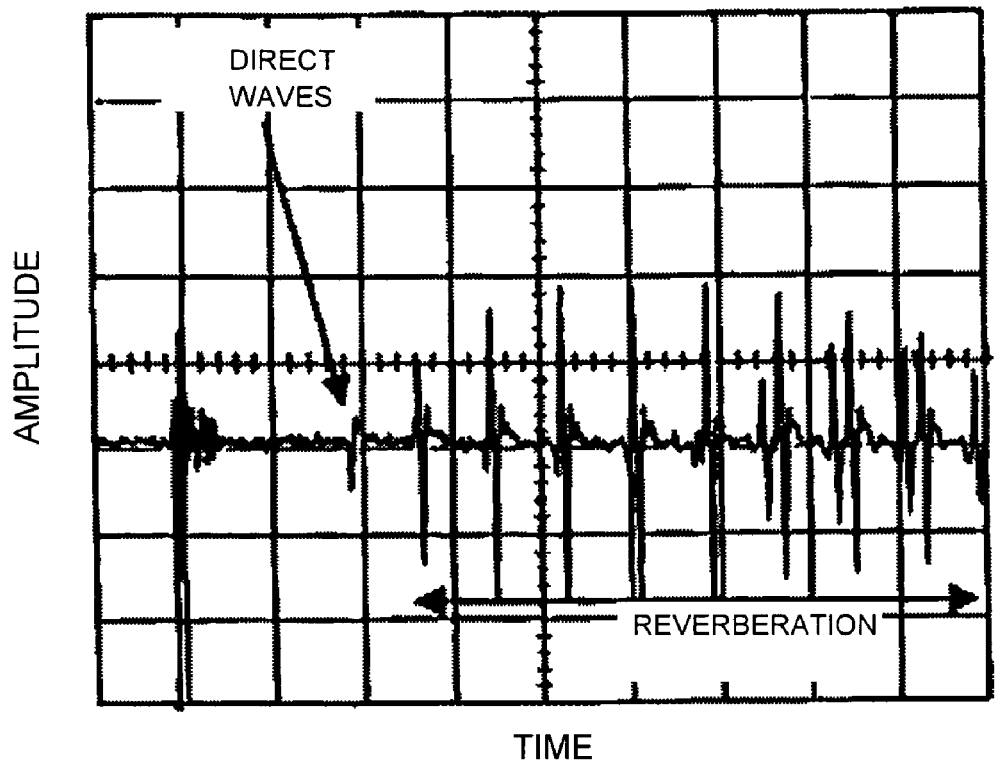
FIG. 7A is a graph showing the characteristics of reverberation of ultrasonic waves received at the receiving ultrasonic transducer in the ultrasonic transmitting/receiving device according to the first preferred embodiment of the present invention.
Figure 7B:
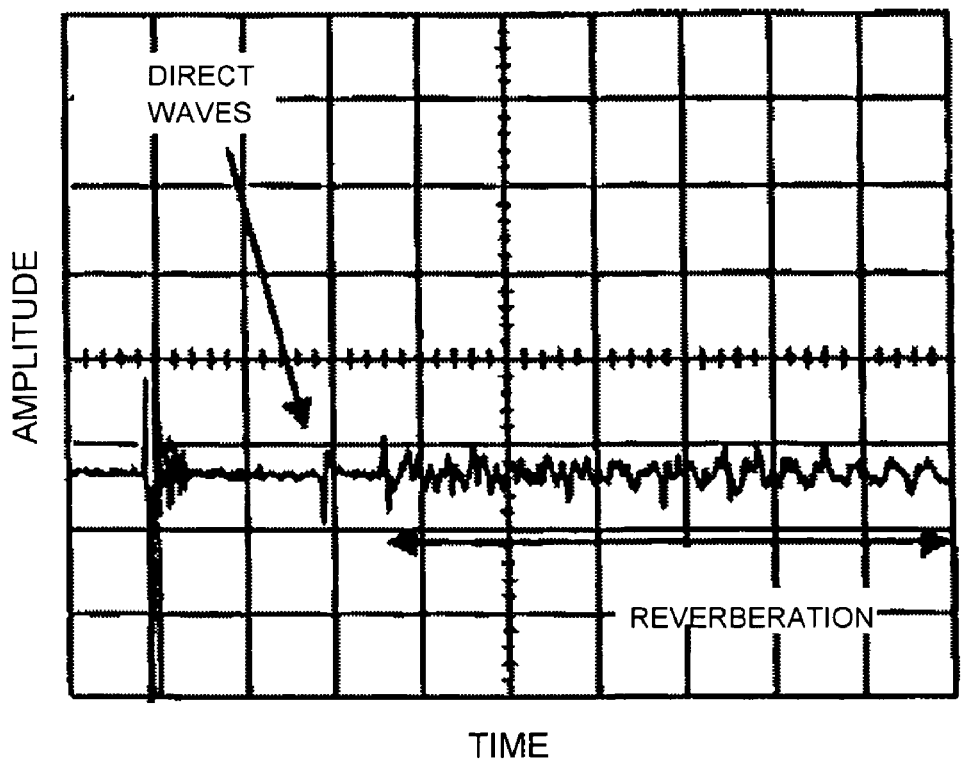
FIG. 7B is a graph showing the characteristics of reverberation of ultrasonic waves received at the receiving ultrasonic transducer in the ultrasonic transmitting/receiving device according to the second preferred embodiment of the present invention.

FIG. 6A is a schematic diagram showing reflections of ultrasonic waves in a receiving ultrasonic transducer, e.g., the ultrasonic transducer 15b in the ultrasonic transmitting/receiving device 14a of the first preferred embodiment. FIG. 6B is a schematic diagram showing reflections of ultrasonic waves in a receiving ultrasonic transducer, e.g., the ultrasonic transducer 15b in the ultrasonic transmitting/receiving device 14b of the second preferred embodiment. FIG. 7A shows characteristics of the ultrasonic waves caused by reverberation according to the structure shown in FIG. 6A. FIG. 7B shows characteristics of the ultrasonic waves caused by reverberation according to the structure shown in FIG. 6B.

In the ultrasonic transducer 15b of the first preferred embodiment, as shown in FIG. 6A, ultrasonic waves received at the piezoelectric vibrator 9b pass through the interior of the piezoelectric vibrator 9b toward the backing 10b. These ultrasonic waves are entirely reflected by the outer surface of the backing 10b. Therefore, the amplitude of the received waves caused by reverberation is large, as shown in FIG. 7A.

In contrast, in the ultrasonic transducer 15b of the second preferred embodiment, as shown in FIG. 6B, its structure is preferably the same as the ultrasonic transducer 15b of the first preferred embodiment except that the outer surface of the backing 10b, which is not in contact with the piezoelectric vibrator 9b, includes a plurality of projections and depressions. The ultrasonic waves reaching the backing 10b through the piezoelectric vibrator 9b are scattered in the grooves 18 provided on the outer surface of the backing 10b.

When the backing 10b is provided with the grooves 18 on its outer surface, the amplitude of the received waves due to reverberation is greatly reduced, as shown in FIG. 7B, as compared to the backing 10b with the flat outer surface. According to the ultrasonic transducer 15b of the second preferred embodiment, the backing 10b with a plurality of projections and depressions can reduce the amplitude of the received waves attributed to reverberation so that the direct waves can be selectively converted into pulses without difficulty when the sonic velocity is measured.

Figure 8A:
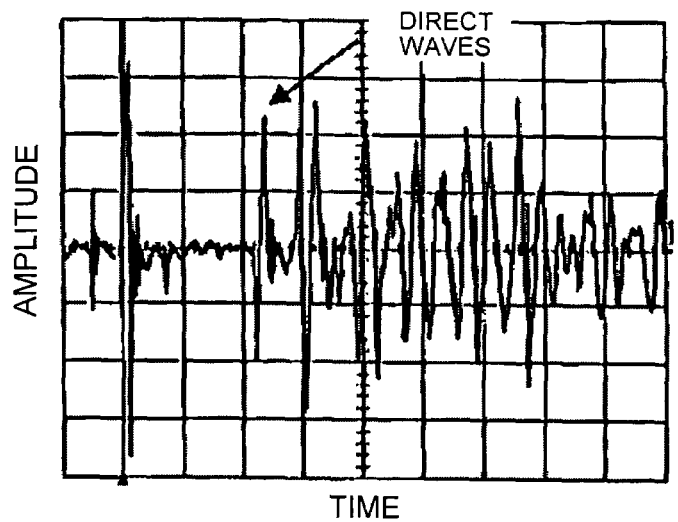
FIGS. 8A, 8B, and 8C are graphs showing the characteristics of reverberation of ultrasonic waves received at ultrasonic transducers in the ultrasonic transmitting/receiving devices according to the second preferred embodiment of the present invention.
Figure 8B:
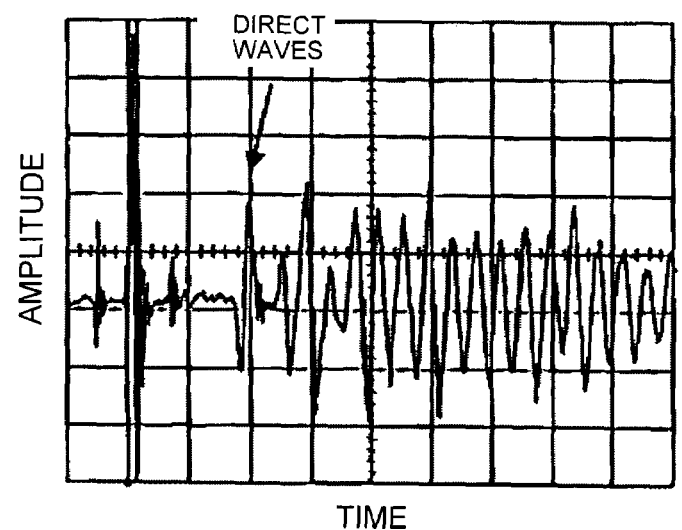
Figure 8C:
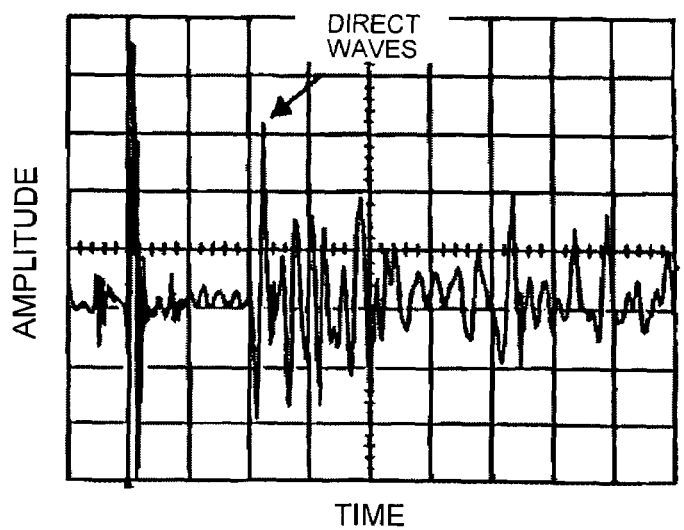

The relationship between the depth of the grooves 18 and reverberation of ultrasonic waves was experimentally determined. First, the three ultrasonic transmitting/receiving devices 14b having the ultrasonic transducers 15b provided with the grooves 18 of different depths were fabricated and placed underwater. Next, pulsed ultrasonic waves were applied to the ultrasonic transducers 15a, which then transmitted the pulsed ultrasonic waves to the ultrasonic transducers 15b, for example. Waveforms of the ultrasonic waves received at the ultrasonic transducers 15b are shown in FIGS. 8A, 8B, and 8C. These waveforms represent the characteristics of reverberation of ultrasonic waves.

The transmitting ultrasonic transducers 15a each had a width A of about 6 mm, a length B of about 9 mm and a thickness C of about 1.8 mm, for example. The activated portions 2e each had a thickness of about 0.16 mm and the grooves 18 formed on the backings 10a each had a depth of about 0.15 mm, for example. The receiving ultrasonic transducers 15b each had a width A of about 6 mm, a length B of about 9 mm and a thickness D of about 1.9 mm, for example. The activated portions 2g each had a thickness of about 0.28 mm, for example. The depths of the grooves 18 provided on the backings 10b for the receiving ultrasonic transducers 15b were, for example, about 0.15 mm, about 0.25 mm, and about 0.75 mm in FIGS. 8A, 8B, and 8C, respectively. The gap E between each ultrasonic transducer 15a and each ultrasonic transducer 15b was about 2.8 mm, for example.

FIG. 8A shows the characteristics of reverberation for the receiving ultrasonic transducer 15b with the approximately 0.15-mm-deep grooves 18. FIG. 8B shows the characteristics of reverberation for the receiving ultrasonic transducer 15b with the approximately 0.25-mm-deep grooves 18. FIG. 8C shows the characteristics of reverberation for the receiving ultrasonic transducer 15b with the approximately 0.75-mm-deep grooves 18.

The experimental results showed that the amplitude of the ultrasonic waves caused by reverberation at the receiving ultrasonic transducer 15b decreases as the grooves 18 provided on the outer surface of the backing 10b increases. When the depth of the grooves 18 was about 0.75 mm at the ultrasonic transducer 15b, the amplitude of the direct waves was greater than the amplitude of the received waves caused by reverberation. Thus, with the approximately 0.75-mm-deep grooves 18 for the backing 10b, the direct waves can be selectively converted into pulses without difficulty when the sonic velocity is measured.

Preferably the depth of the grooves 18 in the receiving ultrasonic transducer 15b is smaller than or equal to about 40 percent of the entire thickness of the ultrasonic transducer 15b. For example, when the entire thickness of the ultrasonic transducer 15b is about 1.9 mm, the depth of the grooves 18 is preferably smaller than or equal to about 0.75 mm (0.75 mm/1.9 mm×100%=39.5%). By selecting the aforementioned depth for the grooves 18, the ultrasonic transducer 15b can minimize the amplitude of the received waves caused by reverberation while having sufficient strength.

In the ultrasonic transmitting/receiving device 14b according to the second preferred embodiment, the outer surfaces of the backing 10a and the backing 10b, which are not in contact with the piezoelectric vibrator 9a and the piezoelectric vibrator 9b respectively, have projections and depressions defined by forming the latticed grooves 18 when viewed from the top, but the outer surfaces of the backing 10a and the backing 10b may have other forms. For example, projections corresponding to the projections separated by the grooves 18 in the second preferred embodiment may be integrally formed on the outer surfaces of the backing 10a and the backing 10b. Alternatively, projections may be separately formed with the same material as that of the piezoelectric body 2 and then affixed to the outer surfaces of the backing 10a and the backing 10b so that they are substantially parallel to each other having a certain gap between the projections.

While the present invention has been described with respect to preferred embodiments, it will be apparent to those skilled in the art that the disclosed invention may be modified in numerous ways and may assume many embodiments other than those specifically set out and described above. Accordingly, it is intended by the appended claims to cover all modifications of the invention which fall within the true spirit and scope of the invention.

What is claimed is:

1. An ultrasonic transmitting/receiving device comprising a pair of ultrasonic transducers and a support, each of the ultrasonic transducers comprising:
   a piezoelectric body;
   a piezoelectric vibrator including a first electrode and a second electrode that are separated by the piezoelectric body; and
   a backing disposed in contact with the first electrode and composed of the same material as a material of the piezoelectric body; wherein
   the pair of ultrasonic transducers are positioned between the support such that the second electrodes face each other with a predetermined gap therebetween and the ultrasonic transmitting/receiving device has a substantially rectangular U-shape when viewed from the side.

2. An ultrasonic transmitting/receiving device according to claim 1, wherein the piezoelectric vibrator and the backing are unitary.

3. An ultrasonic transmitting/receiving device according to claim 1, wherein the first electrode and the second electrode reside inside the piezoelectric body.

4. An ultrasonic transmitting/receiving device according to claim 1, wherein an outer surface of the backing has a plurality of projections and depressions, the outer surface being not in contact with the piezoelectric vibrator.

5. An ultrasonic transmitting/receiving device according to claim 4, wherein the depths of the depressions are smaller than or equal to about forty percent of the entire thickness of the ultrasonic transducer.

6. An ultrasonic transmitting/receiving device according to claim 1, wherein the pair of ultrasonic transducers is unitary with the support.

7. An ultrasonic transmitting/receiving device according to claim 1, wherein the first electrode includes a top internal electrode and a bottom internal electrode.

8. An ultrasonic transmitting/receiving device according to claim 1, wherein the second electrode includes a top internal electrode and a bottom internal electrode.

9. An ultrasonic transmitting/receiving device according to claim 1, wherein the first and second electrodes are substantially parallel to each other.

10. An ultrasonic transmitting/receiving device according to claim 1, wherein the first and second electrodes have substantially square planar shapes or substantially circular planar shapes.

11. An ultrasonic transmitting/receiving device according to claim 1, wherein an outer surface of the backing is flat.

12. A method for fabricating the ultrasonic transmitting/receiving device according to claim 1, the method comprising the steps of:
preparing a fired ceramic structure having two pairs of the first electrode and the second electrode therein; and
removing a mid-portion of the fired ceramic structure, the mid-portion being disposed between said two pairs of the first electrode and the second electrode so that the fired ceramic structure has a substantially rectangular U-shape when viewed from the side.

13. An ultrasonic transmitting/receiving device comprising a pair of ultrasonic transducers and a support, each of the ultrasonic transducers comprising:
a piezoelectric body;
a piezoelectric vibrator including a first electrode and a second electrode that are separated by the piezoelectric body; and
a backing which is disposed in contact with the first electrode and has the same acoustic characteristic impedance as the piezoelectric body; wherein
the pair of ultrasonic transducers are positioned between the support such that the second electrodes face each other with a predetermined gap therebetween and the ultrasonic transmitting/receiving device has a substantially rectangular U-shape when viewed from the side.

14. An ultrasonic transmitting/receiving device according to claim 13, wherein the piezoelectric vibrator and the backing are unitary.

15. An ultrasonic transmitting/receiving device according to claim 13, wherein the first electrode and the second electrode reside inside the piezoelectric body.

16. An ultrasonic transmitting/receiving device according to claim 13, wherein an outer surface of the backing has a plurality of projections and depressions, the outer surface being not in contact with the piezoelectric vibrator.

17. An ultrasonic transmitting/receiving device according to claim 16, wherein the depths of the depressions are smaller than or equal to about forty percent of the entire thickness of the ultrasonic transducer.

18. An ultrasonic transmitting/receiving device according to claim 13, wherein the pair of ultrasonic transducers is unitary with the support.

19. An ultrasonic transmitting/receiving device according to claim 13, wherein the first electrode includes a top internal electrode and a bottom internal electrode.

20. An ultrasonic transmitting/receiving device according to claim 13, wherein the second electrode includes a top internal electrode and a bottom internal electrode.

21. An ultrasonic transmitting/receiving device according to claim 13, wherein the first and second electrodes are substantially parallel to each other.

22. An ultrasonic transmitting/receiving device according to claim 13, wherein the first and second electrodes have substantially square planar shapes or substantially circular planar shapes.

23. An ultrasonic transmitting/receiving device according to claim 13, wherein an outer surface of the backing is flat.

24. A method for fabricating the ultrasonic transmitting/receiving device according to claim 13, the method comprising the steps of:
preparing a fired ceramic structure having two pairs of the first electrode and the second electrode therein; and
removing a mid-portion of the fired ceramic structure, the mid-portion being disposed between said two pairs of the first electrode and the second electrode so that the fired ceramic structure has a substantially rectangular U-shape when viewed from the side.

* * * * *